United States Patent [19]

Nakaya

[11] Patent Number: 4,597,303

[45] Date of Patent: Jul. 1, 1986

[54] DRIVABLY CONNECTING CONSTRUCTION IN MEASURING INSTRUMENT

[75] Inventor: Tadao Nakaya, Utsunomiya, Japan

[73] Assignee: Mitutoyo Mfg. Co., Ltd., Tokyo, Japan

[21] Appl. No.: 676,378

[22] Filed: Nov. 30, 1984

[30] Foreign Application Priority Data

Dec. 5, 1983 [JP] Japan .................. 58-187674[U]

[51] Int. Cl.[4] ............................................. F16H 25/24
[52] U.S. Cl. ................................ 74/89.15; 74/424.8 R
[58] Field of Search ...................... 74/89.15, 424.8 R

[56] References Cited

U.S. PATENT DOCUMENTS

| 3,665,782 | 5/1972 | Loftus | 74/424.8 R |
| 3,745,840 | 7/1923 | Guralnick | 74/89.15 |
| 4,302,981 | 12/1981 | Wayman | 74/424.8 R |
| 4,372,222 | 2/1983 | Tice | 74/424.8 R |
| 4,372,223 | 2/1983 | Iwatani | 74/89.15 |

FOREIGN PATENT DOCUMENTS 752078 7/1980 U.S.S.R. ................. 74/424.8 R

Primary Examiner—Lawrence J. Staab
Attorney, Agent, or Firm—Flynn, Thiel, Boutell & Tanis

[57] ABSTRACT

This disclosure depicts a drivably connecting construction in a measuring instrument for connecting a main body of measuring instrument to a nut member threadably coupled to a feed screwshaft, including:

a first engaging device (28) in which a connecting plate (24) is loosely coupled onto a nut member (21) and this connecting plate (24) is clamped from opposite sides in the feeding direction through balls (25); a second engaging device (39) for tiltably connecting a portion of the connecting plate (24) to the side (14) of the main body of measuring instrument; and a third engaging device (48) for clamping an arm (41) protruded from the nut member (21) through balls (45) to thereby make the nut member (21) unrotatable relative to the main body of measuring instrument.

11 Claims, 4 Drawing Figures

DRIVABLY CONNECTING CONSTRUCTION IN MEASURING INSTRUMENT

BACKGROUND OF THE INVENTION

1. Field of the Invention

This invention relates to a drivably connecting construction in a measuring instrument, for connecting a main body of a measuring instrument (slider) to a nut member threadably coupled to a feed screwshaft mainly used in a feeding mechanism of a high precision measuring instrument, such as a coordinate measuring instrument.

2. Description of the Prior Art

In general, a basic construction shown in FIG. 1 is adopted in the case of using a feed screwshaft in a feeding mechanism of a measuring instrument. More specifically, as shown in this drawing, a feed screwshaft 1 is rotated by a driving motor 2, a nut member 3 is threadably coupled onto the feed screwshaft 1, a main body 4 (slider) of the measuring instrument is connected to this nut member 3 and the main body 4 is moved commensurate to a rotation value of the feed screwshaft 1, being guided by a guide rail 5 extending in parallel to the feed screwshaft 1 and so on.

Now, when the nut member 3 and the main body 4 are integrally connected to each other in a manner not to be displaceable relative to each other, an excessively strong force applied to a particularly weak constituent may possibly cause the constituent to be damaged. Such errors may occur in the assembling accuracy wherein an error in exists between the feed screwshaft 1 and the guide rail 5, and where fluctuations (yawing, rolling and pitching) and the like occur during the rotation of the screwshaft.

To obviate the above-described disadvantages, there is known such an arrangement that the nut member 3 and the main body 4 of the measuring instrument are connected to each other through a resilient member, or a cylindrical portion is provided on the main body 4, and a ball coupled into this cylindrical portion is fixed to the nut member 3, whereby a relative displacement between the nut member 3 and the main body 4 is absorbed. However, the conventional device as described above is constructed only on the basis of the absorption of the relative displacement (shift in position) between the nut member 3 and the main body 4, and, when the conventional device is applied to a high precision and large-sized, as the case may be, measuring instrument such for example as a coordinate measuring instrument, an adverse influence on the measuring accuracy is disadvantageous, in particular.

More specifically, a tolerance capable of absorbing a relative displacement value between the nut member 3 and the main body 4 is high, whereas, for example, an error tends to occur easily in the feed value of the main body 4 due to a change in the sliding resistance with the guide rail 5 and the like, whereby it is difficult to maintain the proof accuracy of the feed value. In other words, with the conventional device, it has been permitted that the nut member 3 and the main body 4 may be shifted in the positional relationship with each other in each of the tridimensional directions, whereby it has been impossible to control the feed value with high accuracy, with the result that it has been impossible to carry out a high precision screw feed.

SUMMARY OF THE INVENTION

The present invention has as its object the provision of a drivably connected construction in a measuring instrument, wherein a movement of the main body of measuring instrument relative to the nut member is permitted so that errors included during the assembling and an adverse influence of fluctuations during the rotation of the feed screwshaft on the main body instrument can be absorbed, and moreover, a feed value can be made accurate.

To this end, the present invention contemplates that, with special case being paid to avoid interferences occurring therebetween, there are provided: first engaging means for engaging a connecting plate loosely coupled to a nut member threadably coupled to a feed screwshaft and directed in a direction perpendicularly intersecting the feeding direction with the nut member in a manner to clamp from opposite sides of the connecting plate in the feeding direction so that the connecting plate is not relatively displaceable in the feeding direction and is relatively displaceable in the direction of the surface of the connecting plate; second engaging means for engaging the connecting plate with a main body of measuring instrument in a manner to clamp from opposite sides of the connecting plate in the feeding direction so that the connecting plate is not relatively displaceable in the feeding direction and tiltable within a predetermined range to a direction of the surface of the connecting plate; and third engaging means for relatively unrotatably engaging the nut member with the main body in such a manner that an arm fixed to either one of the nut member and the main body is clamped by the other of the nut member and the main body while the arm is permitted to be spaced a predetermined distance apart from opposite sides in the circumferential direction of the nut member; where by fluctuations such as yawing, rolling and pitching of the nut member threadably coupled to the feed screwshaft and errors included during the assembling are absorbed (allowed) by the connecting plate.

DETAILED DESCRIPTION OF THE PREFERRED EMBODIMENT

Description will hereunder be given of one embodiment of the present invention with reference to the drawings.

Figure 1:
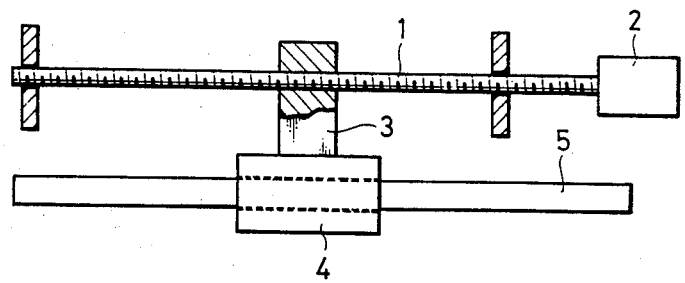
FIG. 1 is a plan view showing the schematic arrangement of the drivably connected construction of the conventional measuring instrument.
Figure 2:
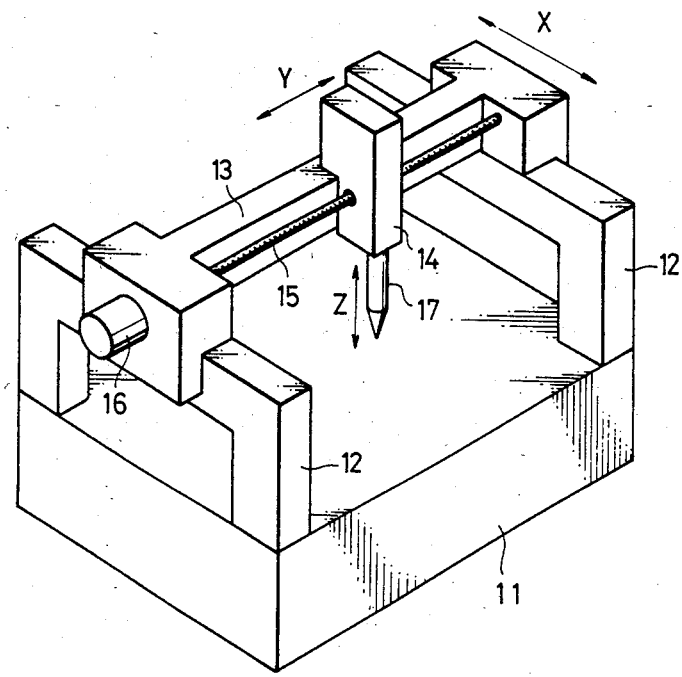
FIG. 2 is a perspective view showing the general arrangement of the coordinate measuring instrument, to which is applied one embodiment of the drivably connecting construction of the measuring instrument according to the present invention.

FIG. 2 shows the general arrangement of one embodiment, in which the drivably connecting construction in the measuring instrument according to the present invention is applied to a coordinate measuring instrument. Referring to the drawing, a movable rail 13 is supported on columns 12 erected at opposite sides of a base plate 11 in a manner to be movable in a direction of the X axis, and a slider 14, serving as a main body of a measuring instrument, is movably supported on this movable rail 13 in a direction of the Y axis. A feed screwshaft 15 is mounted to the movable rail 13 in a manner to be rotatable and in parallel to the rail 13, and the feed screwshaft 15 can be rotated by a driving motor 16 under such a condition that the angle of rotation is controlled at high accuracy. Furthermore, a spindle 17 is supported on the slider 14 in a manner to be movable in a direction of the Z axis. With the above arrangement, the spindle 17 is made movable tridimensionally in the directions of the X, Y and Z axes, which are perpendicularly intersecting one another.

Figure 3:
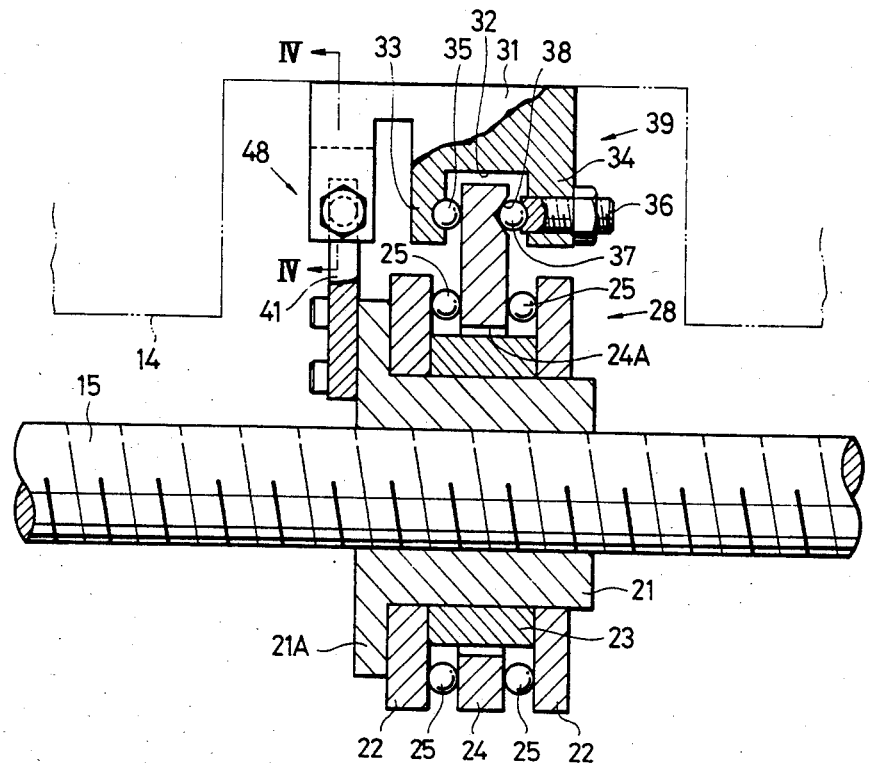
FIG. 3 is a partially cut away front view enlargedly showing the above embodiment.

FIG. 3 shows the inner construction of the slider 14. In the drawing, threadably coupled to the feed screwshaft 15 is a nut member 21 provided at one end thereof with a flange portion 21A. Coupled and fixed onto this nut member 21 are two ring-shaped clamp plates 22 in a manner to clamp a spacer 23 therebetween and be spaced a predetermined distance apart from each other. Furthermore, the two clamp plates 22 are directed in a direction perpendicularly intersecting the feeding direction (the axial line of the feed screwshaft 15).

A connecting plate 24 formed at the substantially central portion with an insertion hole 24A is loosely coupled onto the spacer 23. This connecting plate 24 is oriented so that the plane thereof perpendicularly intersects the axis of the screwshaft and has the opposite side surfaces finished to be very smooth by a high precision polishing. A plurality of hard balls 25 are interposed between the opposing side surfaces of the two clamp plates 22 and the opposite side surfaces of the connecting plate 24. The plurality of hard balls 25 are arranged and held at regular intervals by a retainer, not shown, in the circumferential direction of the retainer. Furthermore, the respective hard balls 25 come into point-to-point turning contact (or point-to-point sliding contact) with the side surfaces of the clamp plates 22 and the connecting plate 24, and the connecting plate 24 clamped by the hard balls 25 from both sides in the feeding direction are held between the two clamp plates 22 in a state of being directed in a direction perpendicularly intersecting the feeding direction. Here, the clamp plates 22 and the hard balls 25 constitute first engaging means 28 for engaging the connecting plate 24 with the nut member 21 such that a connecting plate 24 is clamped from the both sides in the feeding direction and not relatively displaceable due to the rigid contact in the feeding direction, while, the connecting plate 24 is brought into point-to-point turning contact (or point-to-point sliding contact) in the direction of the surface of the connecting plate 24 and relatively displaceable in the direction of the surface of the connecting plate 24.

A portion of the connecting plate 24 is extended a predetermined length further outwardly from the clamp plates 22 in the diametrical direction of the nut member 21 and this extended portion is loosely inserted into a recess 32 formed in a main body connecting bracket 31. This main body connecting bracket 31 is connected to the slider 14 as being the main body of measuring instrument.

Out of two protrusions 33 and 34 constituting opposing wall members of the recess 32 in the feeding direction, one of the protrusions 33 is embedded thereinto with about one half portion of a hard ball 35 which is fixed thereto, and this hard ball 35 is brought into point-to-point contact with one side surface of the connecting plate 24. Furthermore, an adjusting screw 36 is thread- ably coupled into the other protrusion 34 in the feeding direction, a hard ball 37 is fixed to the forward end of the adjusting screw 36, and this hard ball 37 abuts against the other side surface of the connecting plate 24 in a state of being opposed to the hard ball 35. More specifically, the connecting plate 24 in the recess 32 is clamped by the hard balls 35 and 37 from the opposite side surfaces thereof. Additionally, a portion of the side surface of the connecting plate 24, against which is abutted the hard ball 37, is a tapered depression 38, which is formed into a conical shape. The hard ball 37 is fallen into this depression 38, whereby the connecting plate 24 is tiltably supported, being centered about the hard ball 37 for its tilting. Here, both protrusions 33, 34, both hard balls 35, 37 and the adjusting screw 36 constitute second engaging means 39 for engaging the connecting plate 24 with the slider 14 such that the connecting plate 24 is clamped from both sides in the feeding direction and not relatively displaceable in the feeding direction due to the rigid contact in the feeding direction, while, the connecting plate 24 is tiltable in the direction of the surface of the connecting plate 24.

Figure 4:
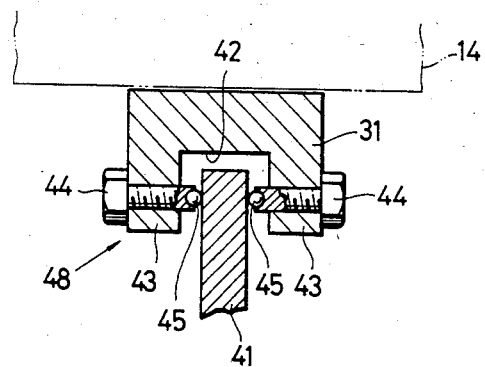
FIG. 4 is a sectional view taken along the line IV—IV in FIG. 3.

An arm 41 is protruded from and fixed to the outer surface of the flange portion 21A outwardly in the diametrical direction of the flange portion 21A. As shown in FIG. 4, the forward end portion of the arm 41 is loosely inserted into a recess 42 for locking the rotation, which is formed in the main body connecting bracket 31. Each of the protrusions 43 constituting both side walls of the recess 42 for locking the rotation is inserted therethrough with an adjusting screw 44 directed toward the arm 41 in the circumferential (tangential) direction of the nut member 21.

A small ball-shaped hard tip 45 is fixed to the forward end of each of the two adjusting screws 44. In other words, the arm 41 is clamped by the hard tips 45 in point-to-point contact from the opposite sides thereof in the diametrical direction of the nut member 21. Here, the both protrusions 43 for locking the rotation, the adjusting screws 44 and the hard tips 45 constitute a third engaging means 48 for relatively unrotatably (rotation centered about the feed screwshaft 15) engaging the nut member 21 with the slider 14 such that the arm 41 is clamped from the opposite sides thereof in the circumferential direction of the nut member 21 on the side of the slider 14 while the arm 41 is permitted to be spaced a predetermined distance apart from opposite sides in the circumferential direction of the nut member 21. Additionally, the arm 41 clamped between the both hard tips 45 is movable relative to the slider 14 in directions other than the rotating direction of the nut member 21, such for example as the feeding direction and the diametrical direction.

Description will now be given of action the operation of this embodiment.

When the feed screwshaft 15 is rotated by the driving motor 16 under the high precision control, the nut member 21 locked in its rotation by the movable rail 13 through the slider 14 or the like is moved in the axial direction of the feed screwshaft 15, i.e. the feeding direction.

At this time, the connecting plate 24 is not movable in the feeding direction relative to the nut member 21 in the first engaging means 28 and to the main body connecting bracket 31 in the second engaging means 39, whereby the feed value of the nut member 21 is transmitted to the main body connecting bracket 31 with very high accuracy.

When fluctuations such as yawing, rolling and pitching are caused to the nut member 21, the connecting plate 24 is moved through the hard balls 25 relative to the clamp plates 22 in the direction of the surface of the connecting plate 24. The connecting plate 24 is made movable through the hard balls 35 and 37 relative to the main body connecting bracket 31 in the direction of the surface of the connecting plate 24. In consequence, even if such a fluctuation as described above is caused to the nut member 21, the connecting plate 24 freely moves in the direction of the surface thereof, whereby these fluctuations are absorbed, so that the fluctuations are not transmitted to the main body connecting bracket 31.

Furthermore, the nut member 21 is connected to the main body connecting bracket 31 also in the third engaging means 48. The arm 41 constituting the third engaging means 48 is regulated with high accuracy in its relative displacement in the rotating direction (the diametrical direction of the nut member 21) by the adjusting screws 44 clamping the arm 41 from the opposite sides of the arm 41. However, the arm 41 is displaceable relative to the main body connecting bracket 31 in directions other than the rotating direction such as the direction of the surface of the connecting plate 24. In consequence, also in the third engaging means 48, the fluctuations such as yawing, rolling and pitching are not transmitted from the nut member 21 to the main body connecting bracket 31.

Furthermore, the connecting plate 24 is loosely coupled onto the nut member 21 through the spacer 23 and the connecting plate 24 is rotatable about the hard ball 37 of the second engaging means 39, so that the fluctuations of the nut member 21 in the feeding direction are also absorbed by the connecting plate 24.

The value of fluctuations (tolerance) absorbed and the accuracy of feed value are adjusted by the adjusting screws 36 and 44, respectively, whereby requirements in accuracy in the measuring instrument as a whole, to which the present is applied, can be met.

Furthermore, in the same manner as the fluctuations produced during the rotation of the feed screwshaft 15 are absorbed, errors are absorbed which are included during the assembling, such for example as an error in parallelism between the rail 13 and the feed screwshaft 15, and the like.

The above-described embodiment is advantageous in that, even if various fluctuations such as yawing, rolling and pitching are produced in the nut member 21 and errors are included during the assembling, these errors and fluctuations are not transmitted to the main body connecting bracket 31 (the slider 14), on the contrary, the feed value itself can be transmitted with high accuracy.

Moreover, there are such advantages that, out of the absorbed values of the fluctuations and the like caused to the nut member 21, one in the axial direction of the feed screwshaft 15 can be adjusted by the adjusting screw 36 and another one in the rotating direction of the feed screwshaft 15 can be adjusted by the adjusting screws 44, so that the optimum tolerance of the fluctuations and the accuracy of the feed value can be easily and quickly selected in accordance with the accuracies of the coordinate measuring instrument, to which the present invention is applied.

Furthermore, there are such advantages that the connecting plate 24 is in point-to-point contact with the hard balls 25 and 35 so as to minimize the frictional force, whereby the connecting plate 24 moves quickly, so that the fluctuations and the like caused to the nut member 21 can be absorbed very quickly.

In working, the arm 41 has been mounted to the nut member 21, however, in contrast thereto, the arm 41 may be secured to the main body connecting bracket 31. Furthermore, the third engaging means 48 need not necessarily be limited to the above-described arrangement wherein the arm 41 is clamped by the hard tips 45 from the opposite sides thereof in the rotating direction, and such an arrangement may be adopted that the main body connecting bracket 31 is permitted to move relative to the nut member 21 in the direction of the surface of the connecting plate 24, and further, is locked against the rotation.

Furthermore, the adjusting screw and 44 should not necessarily be needed, however, it is convenient that the adoption of the adjusting screw makes it possible to suitably adjust the tolerance of the fluctuations and the like and the accuracy of the feed value.

As has been described hereinabove, the present invention is so advantageous as to be able to provide a drivably connected construction of the measuring instrument wherein the movement of the main body of the measuring instrument relative to the nut member is permitted, so that errors included during the assembling and fluctuations caused to the nut member during the rotation of the feed screwshaft are not transmitted to the main body of measuring instrument, and moreover, the feed value can be made accurate.

What is claimed is:

1. A drivably connecting construction in a measuring instrument for connecting a main body of said measuring instrument to a nut member threadably coupled to a feed screwshaft, said construction comprising:

a connecting plate loosely encircling said nut member and having a pair of oppositely facing surface extending in a direction perpendicularly intersecting an axis of said screwshaft;

first engaging means for engaging opposite sides of said connecting plate to prevent said connecting plate from being displaceable relative to said nut member in a direction perpendicular to said surfaces on said connecting plate;

second engaging means for connecting said connecting plate to said main body of said measuring instrument, said second engaging means engaging opposite sides of said connecting plate to prevent said connecting plate from being displaceable relative to said main body in a direction perpendicular to said surfaces on said connecting plate but allowing a relative tilting movement within a predetermined range; and third engaging means for limiting rotation of said nut member relative to said screwshaft and to said main body of said measuring instrument, said engaging means including a recess in at least one of said nut member and said main body, said recess having a pair of spaced walls therein, and an arm, one end of which is fixed to at least the other of said nut member and said main body, the other end of said arm being clamped between said pair of spaced walls in said recess, said other end of said arm being spaced a predetermined distance from said of pair of spaced walls in a circumferential direction of said nut member;

said second engaging means including, opposing protrusions forming therebetween a recess for receiving a portion of said connecting plate extended toward said main body of said measuring instrument, balls interposed between opposing surfaces on said protrusions and said extended portion, and an adjusting screw for making a ball on one side of said extended portion adjustable in its position in a direction parallel to said axis of said feed screwshaft.

2. A drivably connecting construction in a measuring instrument as set forth in claim 1, wherein said oppositely facing surfaces on said connecting plate are smooth surfaces.

3. A drivably connecting construction in a measuring instrument as set forth in claim 1, wherein a spacer is interposed between said connecting plate and said nut member, and wherein said second engaging means includes adjusting means for setting a displacement value of said nut member relative to said main body.

4. A drivably connecting construction in a measuring instrument as set forth in claim 1, wherein said connecting plate and said nut member are in relatively rotating contact with each other.

5. A drivably connecting construction in a measuring instrument as set forth in claim 1, wherein said first engaging means comprises:
   a pair of clamp plates coupled onto said nut member on opposite sides of said connecting plate; and
   balls interposed between opposing surfaces of said clamp plates and said connecting plate.

6. A drivably connecting construction in a measuring instrument as set forth in claim 1, wherein a portion of said connecting plate, with which said ball on one side of said extended portion comes into contact, is formed into a tapered depression.

7. A drivably connecting construction in a measuring instrument as set forth in claim 1, wherein another ball on the other side of said extended portion is embedded in and fixed to the surface of one of said opposing protrusions and brought into point-to-point contact with said extended portion of said connecting plate.

8. A drivably connecting construction in a measuring instrument as set forth in claim 1, wherein said arm is provided on said nut member and said third engaging means is provided on said main body of said measuring instrument.

9. A drivably connecting construction in a measuring instrument as set forth in claim 1, wherein said predetermined distance in said third engaging means is adjustable.

10. A drivably connecting construction in a measuring instrument as set forth in claim 8, wherein said third engaging means includes:
    a pair of protrusions with said other end of said arm being received therebetween;
    balls interposed between said protrusions and surfaces on said arm; and
    adjusting screws for facilitating a support and an adjustment of the position of said balls in the circumferential direction of said nut member.

11. A drivably connecting construction in a measuring instrument having a pair of columns erected on opposite side portions of a base plate; a movable rail extending between said columns and movable in an X axis direction; a feed screwshaft provided on said movable rail and extending parallel to said movable rail and driven by a driving motor; and a slider threadably coupled to said feed screwshaft and movable in a Y axis direction on said movable rail and a spindle displaceably mounted on said slider for movement in a Z axis direction, said drivably connecting construction comprising:
    a nut member threadably coupled to said feed screwshaft;
    a pair of clamp plates fixed to the outer periphery of said nut member, a spacer between said clamp plates and spacing said clamp plates a predetermined distance apart from each other in a direction parallel to the axis of said feed screwshaft;
    a connecting plate loosely encircling the outer periphery of said spacer and is oriented so that a plane defined thereby intersects an axial line of said feed screwshaft, a portion of said connecting plate being extended toward said slider;
    a plurality of balls interposed between said connecting plate and said clamp plates to prevent a displacement of said connecting plate relative to said screwshaft but permitting displacement in the direction of a surface on said connecting plate;
    a bracket providing on said slider having protrusions opposed to the opposite sides of said extended portion of said connecting plate;
    balls interposed between said protrusions and said extended portion on said connecting plate for making said connecting plate tiltable in the direction a said surface on said connecting plate, one of said balls being able to adjust said connecting plate in its position through an adjusting means;
    an arm protruding from said nut member toward said slider;
    a pair of protrusions on said slider for receiving therein an outer end portion of said arm, said protrusions being opposed to each other and on opposite sides of said arm in the circumferential direction of said nut member; and
    further adjusting means threadably coupled into said protrusions on said slider, each of which is provided at the forward end thereof with a ball contacting said arm to thereby prevent said nut member from rotating relative to said slider.

* * * * *